(12) United States Patent
Belter et al.

(10) Patent No.: US 7,942,138 B1
(45) Date of Patent: May 17, 2011

(54) OUTBOARD MOTOR WITH EXHAUST GAS RECIRCULATION COOLING

(75) Inventors: David J. Belter, Oshkosh, WI (US);
Jeffrey J. Broman, Slinger, WI (US);
Eric S. Mueller, Fond du Lac, WI (US);
Timothy S. Reid, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 491 days.

(21) Appl. No.: 12/053,731

(22) Filed: Mar. 24, 2008

(51) Int. Cl.
*F02M 25/07* (2006.01)
*F02B 47/08* (2006.01)
*F01N 3/04* (2006.01)
*B63H 21/32* (2006.01)

(52) U.S. Cl. ............................. 123/568.12; 440/89 B (58) Field of Classification Search ............... 123/41.31, 123/568.11–568.13; 440/88 C, 88 D, 88 G, 440/88 J, 88 K, 88 M, 89 R, 89 B, 89 C, 440/89 D, 89 G
See application file for complete search history.

(56) References Cited

U.S. PATENT DOCUMENTS

| 5,762,051 A | 6/1998 | Okamoto | |
|---|---|---|---|
| 6,662,789 B1 | 12/2003 | Hatano | |
| 7,089,890 B2 | 8/2006 | Obidi | |
| 7,182,074 B1 | 2/2007 | Redon et al. | |
| 7,185,642 B1 | 3/2007 | Redon et al. | |
| 7,275,526 B2 | 10/2007 | Sugimoto et al. | |
| 7,516,737 B2 * | 4/2009 | Cerabone et al. | 123/568.12 |
| 7,584,749 B2 * | 9/2009 | Kardos et al. | 123/568.12 |
| 7,625,257 B1 * | 12/2009 | Broman et al. | 440/89 B |
| 7,757,678 B2 * | 7/2010 | Marsh et al. | 123/568.12 |
| 2007/0017489 A1 * | 1/2007 | Kuroki et al. | 123/568.12 |
| 2009/0114171 A1 * | 5/2009 | Hayashi | 123/568.12 |

FOREIGN PATENT DOCUMENTS

| JP | 09109995 A | * | 4/1997 |
|---|---|---|---|
| JP | 2001130490 A | * | 5/2001 |

* cited by examiner

*Primary Examiner* — Willis R Wolfe, Jr.
(74) *Attorney, Agent, or Firm* — William D. Lanyi (57) ABSTRACT

An outboard motor is provided with an exhaust gas recirculation (EGR) system that provides a heat exchanger which reduces the temperature of the exhaust gas prior to introducing the exhaust gas to the cylinders of the engine. The heat exchanger can be integral to the engine, particularly the cylinder head of the engine, or it can be disposed outside the structure of the engine. When disposed outside the structure of the engine, the heat exchanger can comprise a tubular structure that causes exhaust gas and water, from the body of water, to flow in thermal communication with each other. Alternatively, the heat exchanger which is disposed outside the structure of the engine can use a cavity within the driveshaft housing as a heat exchanger with water being sprayed into the stream of exhaust gas as it passes from the engine to the cavity.

17 Claims, 5 Drawing Sheets

OUTBOARD MOTOR WITH EXHAUST GAS RECIRCULATION COOLING

The present invention is generally related to the invention described in U.S. patent application Ser. No. 12/053,0787, now issued as U.S. Pat. No. 7,625,257, which was filed by Broman et al. on the same date as the present invention.

BACKGROUND OF THE INVENTION

1. Field of the Invention

The present invention is generally related to an outboard motor and, more particularly, to an outboard motor that provides cooling of exhaust gas used in an exhaust gas recirculation EGR system.

2. Description of the Related Art

Those skilled in the art of internal combustion engines are familiar with the concept of exhaust gas recirculation. Various techniques, procedures, and equipment are known to those skilled in the art for the purpose of accomplishing exhaust gas recirculation.

U.S. Pat. No. 5,762,051, which issued to Okamoto on Jun. 9, 1998, describes an exhaust gas recirculation system for an engine. A method and device for controlling the nitrogen oxide production of an internal combustion engine having at least one cylinder with a cylinder head and an air intake and exhaust passage is described. The device comprises an exhaust gas recirculation system. In one embodiment, a portion of the exhaust gas produced by the engine is routed through a bypass line from the exhaust passage through a valve to the air intake passage. In another embodiment, the bypass line extends in the space between the two banks of a V-type engine along an intake manifold. In another embodiment, the bypass line is a passage extending through the cylinder head from an exhaust passage to a valve having an outlet in communication with the air intake passage leading to that cylinder.

U.S. Pat. No. 6,662,789, which issued to Hatano on Dec. 16, 2003, describes a water cooled exhaust gas recirculating device. It has a hole-open/closed mechanism allowing communication with outside air. The mechanism is arranged at a cooling water recirculation passage cooling an exhaust gas recirculation valve. A drain bolt is used as the hole-open/closed mechanism. The mechanism is arranged at a stopper stopping up a hole formed during manufacturing of the cooling water recirculation passage.

U.S. Pat. No. 7,089,890, which issued to Obidi on Aug. 15, 2006, describes a cooling system for an internal combustion engine with exhaust gas recirculation (EGR). A cooling system pumps coolant through parallel connections to a crankcase and an EGR cooler in an internal combustion engine with exhaust gas recirculation. A crankcase supply conduit connects a coolant pump to a coolant channel formed by the crankcase. The coolant channel is connected to a coolant chamber formed by the cylinder head. An EGR cooler supply conduit connects the EGR cooler to the coolant pump. The EGR cooler is connected to the coolant chamber. Coolant flows from the coolant pump into the crankcase supply conduit and into the EGR cooler supply conduit at essentially the same time and at essentially the same temperature. The coolant circulates from the coolant pump through the coolant channel into the coolant chamber. The coolant circulates from the coolant pump through the EGR cooler into the coolant chamber. The coolant returns to the coolant pump from the coolant chamber in the cylinder head.

U.S. Pat. No. 7,182,074, which issued to Redon et al. on Feb. 27, 2007, describes a manifold assembly for an internal combustion engine. The assembly includes a manifold body and first and second housings. The manifold body includes an EGR cooler cavity, an oil cooler cavity, and an air intake manifold. The first housing is adapted to provide a fluid to the EGR and oil cooler cavities. The second housing is adapted to receive the fluid from the EGR and the oil cooler cavities.

U.S. Pat. No. 7,185,642, which issued to Redon et al. on Mar. 6, 2007, describes a manifold body for an internal combustion engine. The body includes an EGR cooler cavity adapted to receive an EGR cooler, an oil cooler cavity adapted to receive an oil cooler, and an air intake manifold configured to provide a gas mixture to the internal combustion engine.

U.S. Pat. No. 7,275,526, which issued to Sugimoto et al. on Oct. 2, 2007, describes a multi-cylinder engine. The engine is capable of inhibiting an EGR cooler from being damaged and at the same time making the EGR cooler compact. On the assumption that a direction where a crankshaft spans in front as a front and rear direction and a widthwise direction of a cylinder head perpendicular to this front and rear direction is deemed as a lateral direction, an intake air distributing passage wall is attached to one lateral side surface of the cylinder head and an exhaust gas converging passage wall attached to the other lateral side of the cylinder head, the exhaust gas converging passage wall having an interior area communicated with an interior area of the intake air distributing passage wall through the EGR cooler. In this multi-cylinder engine, an intake air inlet pipe is made to stand up at an upper portion of the intake air distributing passage wall and the EGR cooler is above the intake air distributing passage wall. Further, the intake air inlet pipe is arranged side by side with the EGR cooler.

The patents described above are hereby expressly incorporated by reference in the description of the present invention.

SUMMARY OF THE INVENTION

An outboard motor made in accordance with a preferred embodiment of the present invention comprises an engine having a plurality of cylinders, an exhaust conduit connected in fluid communication with the plurality of cylinders, an air intake conduit connected in fluid communication with the plurality of cylinders, a recirculation conduit connected in fluid communication between the exhaust conduit and the air intake conduit and configured to direct a flow of exhaust gas to the air intake conduit, a pump configured to draw water from a body of water in which the outboard motor is operating, and a heat exchanger configured to direct the flow of exhaust gas in thermal communication with the water drawn by the pump from the body of water in which the outboard motor is operating. The heat exchanger is disposed outside of the structure of the engine.

DESCRIPTION OF THE PREFERRED EMBODIMENT

Throughout the description of the preferred embodiment of the present invention, like components will be identified by like reference numerals.

Figure 1:
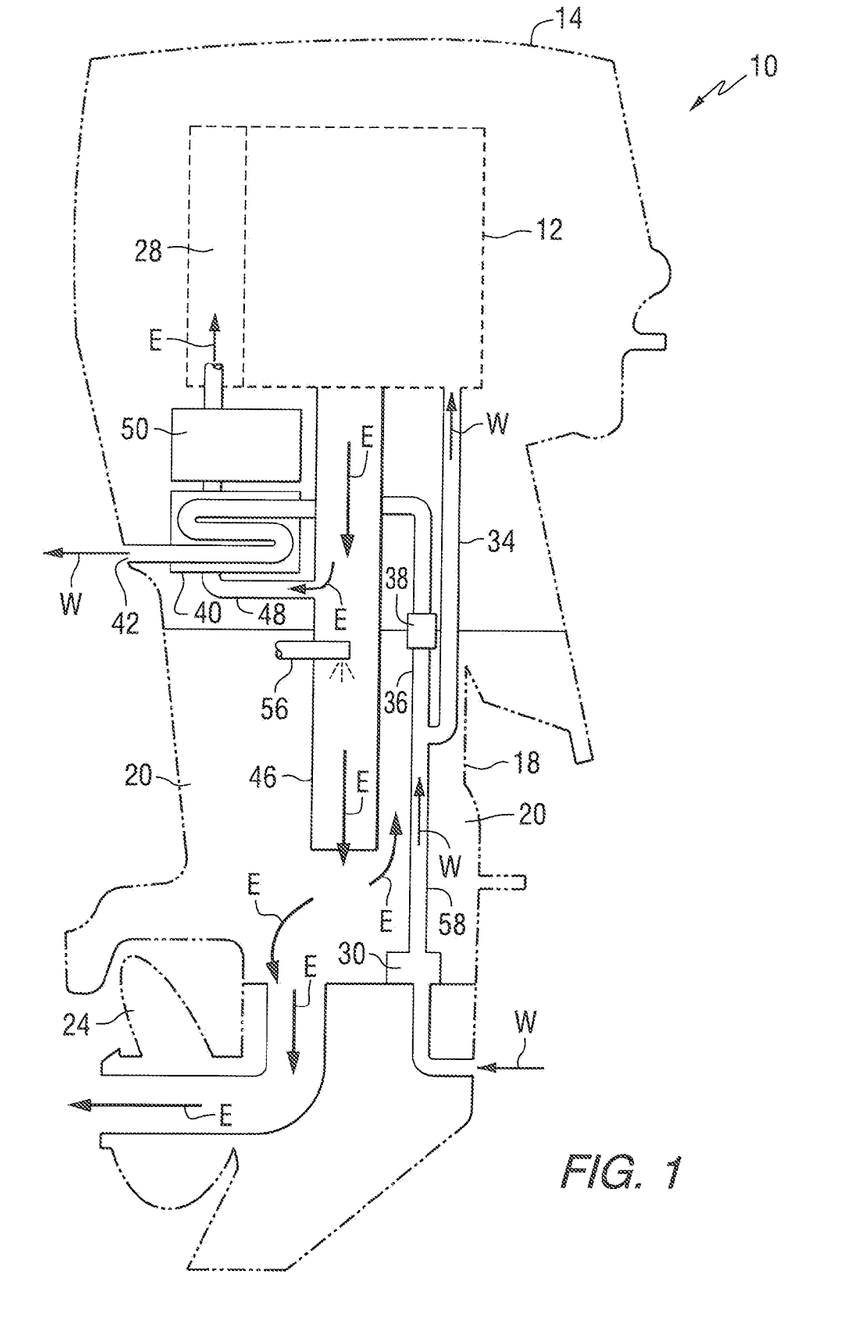
FIG. 1 shows an embodiment of the present invention that comprises a heat exchanger located outside the structure of the engine.

FIG. 1 shows an outboard motor 10 configured according to one of the embodiments of the present invention. As is well known to those skilled in the art, an outboard motor 10 typically comprises an engine 12 disposed under a cowl 14. Below the engine 12, a driveshaft housing 18 has a cavity 20 formed within its structure. Exhaust gas is directed downwardly from the exhaust manifold of the engine 12 into the cavity 20 and, as represented by arrows E, through the cavity 20 and through associated passages which direct the exhaust gas E through the propeller 24. Although the outboard motor 10 is shown in outline in FIG. 1, those skilled in the art of marine propulsion devices are aware of the various components of the outboard motor and the way in which exhaust gas is directed downwardly through the cavity 20 of the driveshaft housing 18. Although the specific exhaust passage in different types of outboard motors can vary in detail, the manner in which the exhaust is directed to and through the propeller 24 is well known.

With continued reference to FIG. 1, the engine 12 has an intake manifold 28 which directs air to the cylinders of the engine. Also shown in FIG. 1 is a water pump 30 that draws water W from a body of water in which the outboard motor 10 is operating and directs a stream of water upwardly as illustrated by arrows W. Some of the water is directed through conduit 34 to the cooling passages of the engine 12. A parallel flow of the water is directed through conduit 36 to a valve 38 which controls the flow of water to a heat exchanger 40. After the water W flows through the heat exchanger 40, it is discharged back to the body of water through opening 42. A portion of the exhaust gas E flowing downwardly through the exhaust pipe 46 is directed through conduit 48 and through the heat exchanger 40. As the exhaust gas E passes through the heat exchanger 40, it is cooled by the flow of water passing in the direction from the valve 38 to the outlet 42. The exhaust gas E continues to flow from the heat exchanger 40 to the air intake manifold 28 of the engine 12. An exhaust gas recirculation valve 50 is provided so that the amount of exhaust gas flowing into the air intake manifold 28 can be controlled. A microprocessor, such as in an engine control module (ECM), is typically used to control the EGR valve. It is not shown in FIG. 1, but those skilled in the art of outboard motor design are aware of the capabilities of engine control modules and how they can be used to control many different components, including valves.

Those skilled in the art of engine design are aware of the advantages that can be achieved through the use of exhaust gas recirculation. By absorbing calories within the combustion chamber, the presence of exhaust gas can lower the pressure within the combustion chamber as a result of the lowering of temperature. This reduced pressure, along with the reduced temperature, decreases the likelihood of the production of nitrogen oxides (NOx). Furthermore, the use of exhaust gas recirculation can have a beneficial effect on the existence of knock in the engine. By reducing the temperature within the combustion chamber, localized hot spots are reduced and the likelihood that knock can occur is also reduced. Another advantage obtained through the use of exhaust gas recirculation is that the pressure within the air intake manifold 28 is increased. As a result, the work needed to be performed by the engine to draw air past the closed, or partially closed throttle, into the combustion chambers is reduced. These advantages are well known to those skilled in the art of engine design.

The advantages obtained through the use of exhaust gas recirculation can be improved, under some conditions, if the temperature of the exhaust gas is maintained below magnitudes which might otherwise not have the beneficial impact on the operation of the engine, as described above. Exhaust gas recirculation coolers, as described in conjunction with the patents discussed above, have been used in the past. However, coolers have not been used in conjunction with outboard motors. As described herein, significant advantage can be obtained by cooling the exhaust gas in an EGR application of an outboard motor because of the availability of relatively cool water that can be obtained from the body of water in which the outboard motor is operated.

With continued reference to FIG. 1, the exhaust gas E passes into the air intake manifold 28 after its temperature is reduced by the heat exchanger 40. The exhaust gas E is also cooled by a spray of water from a water port 56 that is connected in fluid communication with a flow of water from the pump 30, either through a connection between the water port 56 and conduit 58 or, alternatively, through connection to conduit 34. Alternatively, the water injected into the exhaust pipe 46 by the water port 56 can be water that has already passed through the cooling passages of the engine 12 and has reduced its temperature accordingly. In each of these various embodiments, the exhaust gas temperature is reduced as it flows through the exhaust pipe 46 and as the water is sprayed into the exhaust gas stream by the water port 56. As a result, the mixture of exhaust gas E and water vapor within the cavity 20 is at a lower temperature than the temperature of the exhaust gas as it immediately exits from the cylinders of the engine 12. This result is used advantageously in the embodiment of the present invention illustrated in FIG. 2.

Figure 2:
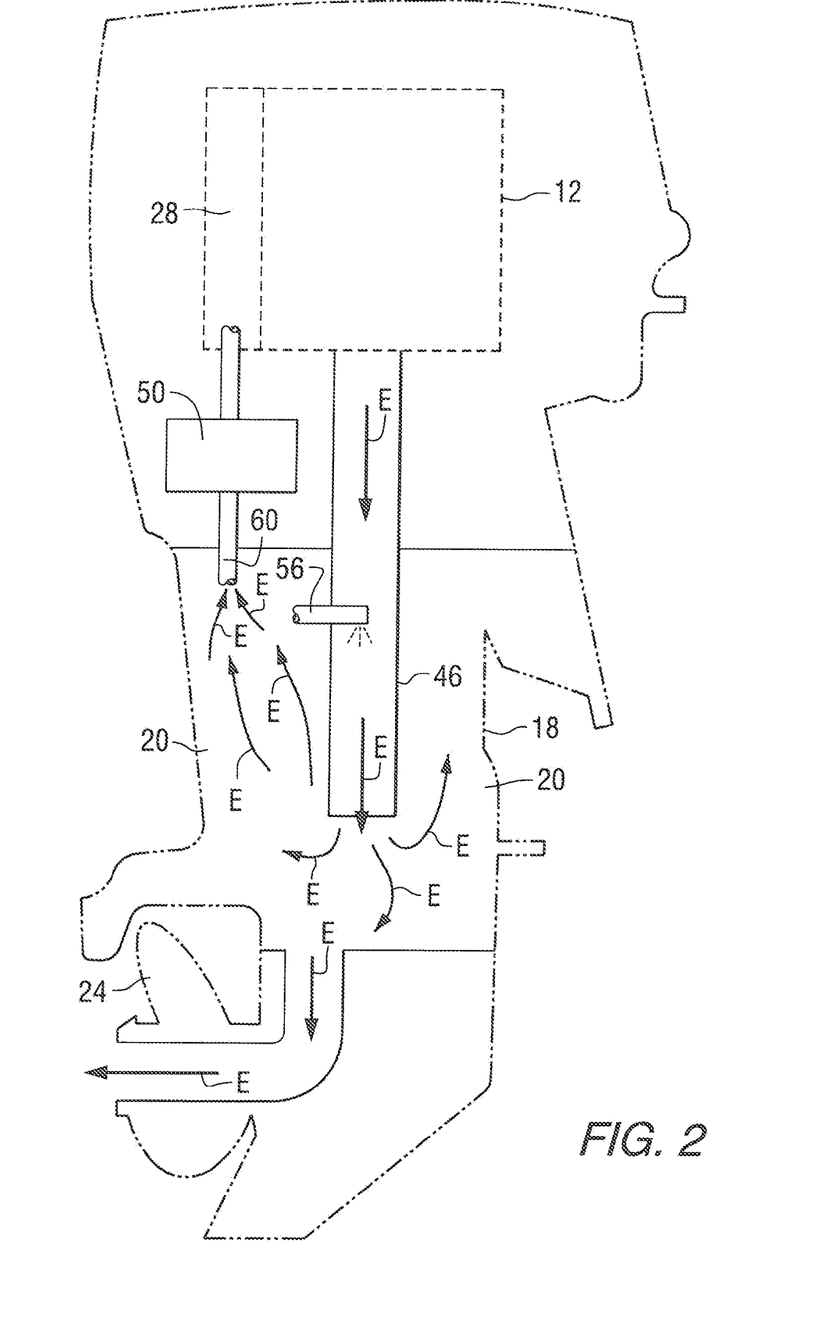
FIG. 2 shows an alternative embodiment of the present invention that utilizes a cavity within the driveshaft housing as a heat exchanger which is located outside the structure of the engine.

In FIG. 2, the cavity 20 within the driveshaft housing 18 is used as a heat exchanger to reduce the temperature of the exhaust gas as it flows from the exhaust pipe 46 into the cavity 20 on its way to its passage through the central part of the propeller 24. Some of that exhaust gas, after it exits from the exhaust pipe 46 into the cavity 20, flows into the conduit identified by reference numeral 60 in FIG. 2. Because of the relative pressures within the cavity 20 and within the air intake manifold 28, this exhaust gas flows toward the air intake manifold. The exhaust gas recirculation valve 50, as described above, can be controlled by a microprocessor in order to regulate the amount of exhaust gas being recirculated to the air intake manifold 28.

With continued reference to FIGS. 1 and 2, these two embodiments of the present invention both provide heat exchangers which are disposed outside of the structure of the engine 12. The function of these heat exchangers is to reduce the temperature of the exhaust gas prior to introducing that exhaust gas into the air intake manifold 28. The embodiment in FIG. 1 uses a heat exchanger 40 to accomplish this task and provides a flow of water, from the body of water in which the outboard motor is operated, to the heat exchanger 40 which flows in thermal communication with the exhaust gas passing through conduit 48 toward the EGR valve 50. The embodiment shown in FIG. 2 uses the cavity 20 within the driveshaft housing 18 as a heat exchanger and relies primarily on the reduction in temperature of the exhaust gas E that results from the spraying of water from the water port 56 into the flowing stream of exhaust gas E.

Figure 3:
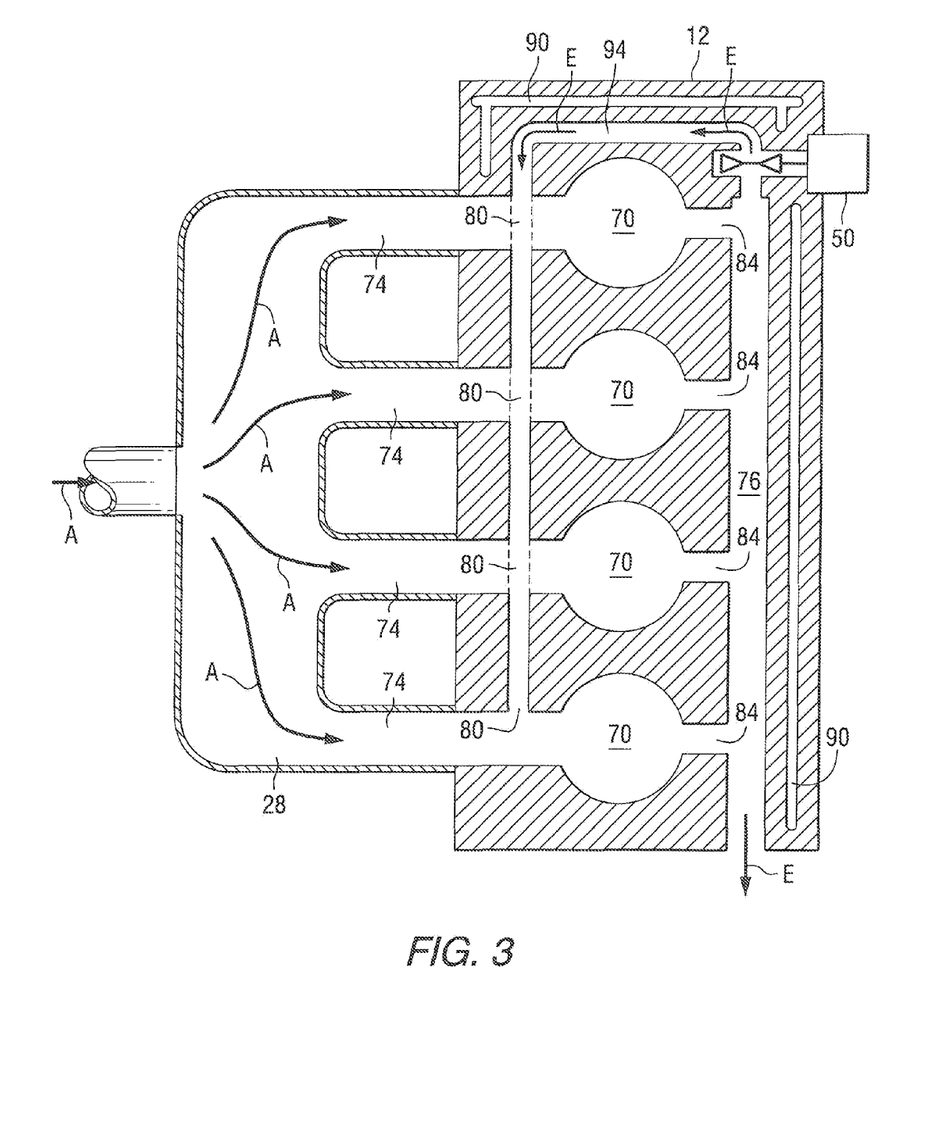
FIG. 3 shows an embodiment of the present invention in which the heat exchanging function is performed within the structure of the engine by passages integrally formed within the cylinder head of the engine.

FIG. 3 is a schematic representation of an engine 12 with its air intake manifold 28 directing flows of air toward the cylinders 70. Air intake conduits, 74, direct the flow of air from the air intake manifold 28 to the individual cylinder 70. Although it should be understood that various embodiments of the present invention can deliver the exhaust gas to the cylinder 70 in different ways, the specific embodiment shown in FIG. 3 delivers the exhaust gas from an exhaust manifold 76 to each of the individual air intake conduits 74 at the locations identified by reference numerals 80.

With continued reference to FIG. 3, the exhaust gas passes from the cylinders 70 to the exhaust manifold 76 through exhaust passages 84. An EGR valve 50 is used to permit or inhibit the flow of exhaust gas as represented by arrows E. When the EGR valve 50 permits this flow, the exhaust gas is directed, as illustrated in FIG. 3, to the exhaust conduits 74 at the regions identified by reference numeral 80.

With continued reference to FIG. 3, the temperature of the exhaust gas E flowing from the exhaust manifold 76 is reduced by its proximity to a water cooling passage 90 which is formed in the head of the engine 12. It should be understood that the cooling passage 90 has a primary function of reducing the temperature of the engine head in the vicinity of the cylinders 70. However, the embodiment of the present invention shown in FIG. 3 takes advantage of the presence of the this cooling passage 90 and uses the cooling water flowing through it to reduce the temperature of the exhaust gas E, particularly that portion of the exhaust gas that is recirculated back to the regions 80 so that it can be directed back into the cylinders 70. In the embodiment shown in FIG. 3, the heat exchanging function is performed in the vicinity where the conduit 90 and the recirculation conduit 94 are disposed in thermal communication with each other. This heat exchanging function is performed within the structure of the engine. The recirculation conduit 94 is formed as an integral passage within the structure of the engine 12 and connected in fluid communication between the exhaust conduit, or exhaust manifold 76, and the air intake conduit 74 for each cylinder 70.

With continued reference to FIGS. 1-3, it can be seen that FIGS. 1 and 2 show two embodiments of the present invention which dispose a heat exchanger outside the structure of the engine 12. The embodiment shown in FIG. 3, on the other hand, disposes the heat exchanger within the structure of the cylinder head of the engine 12.

Figure 4:
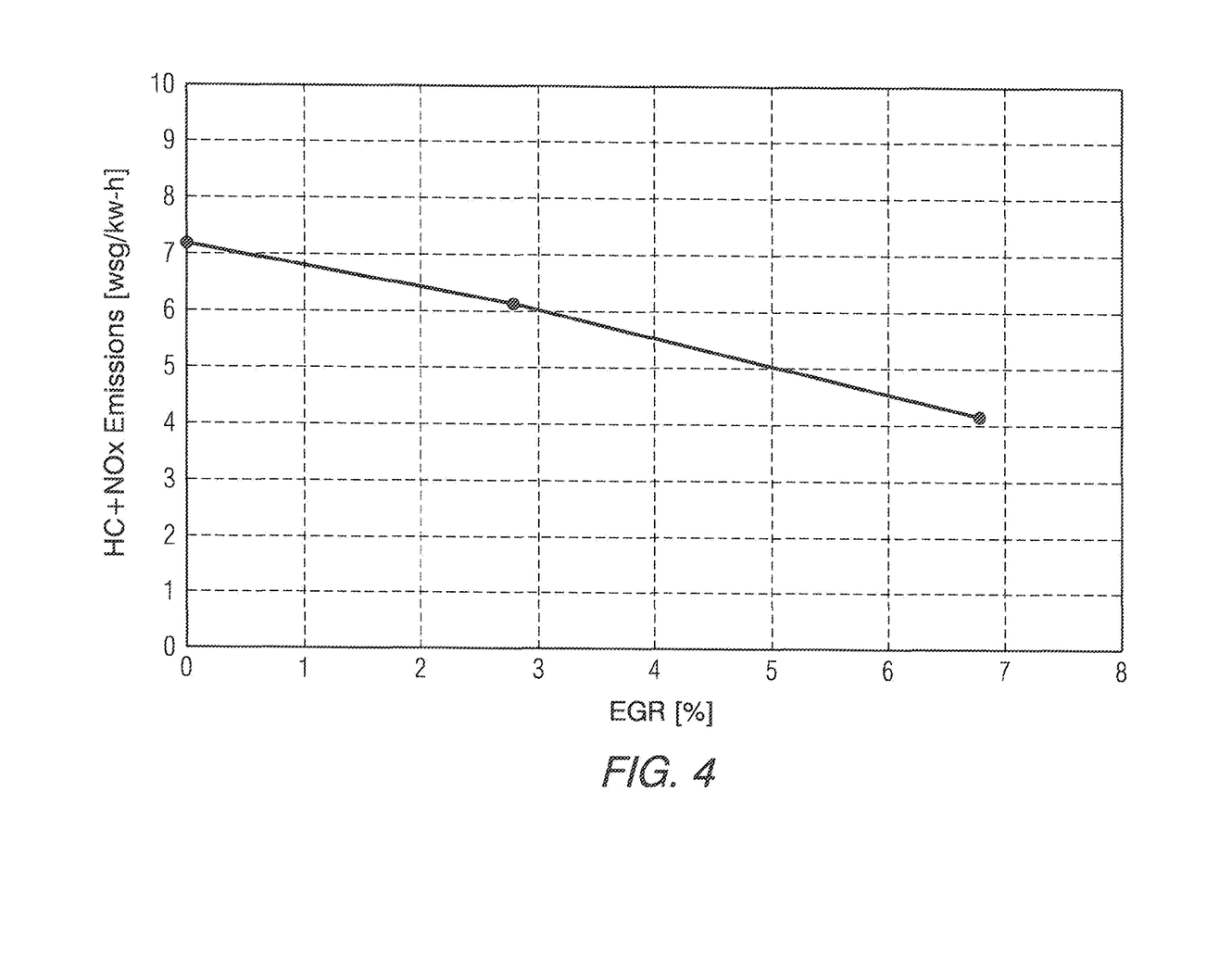
FIG. 4 is a graphical representation showing the beneficial effect of EGR on emissions from the outboard motor engine.

Some of the benefits of using EGR have been described above. FIG. 4 shows actual empirical test data, graphically represented, which show the effect of EGR, as a percentage of the gas flowing into the cylinders 70, on hydrocarbon (HC) and nitrogen oxides (NOx). The emissions represented in FIG. 4 are measured in weight specific grams per kilowatt-hour. As can be seen in FIG. 4, the emissions decrease steadily as the percentage of exhaust gas recirculated to the cylinders increases. As described above, reducing the temperature of the exhaust gas being recirculated serves to improve the beneficial effects since most of the benefits obtained through the use of EGR relate to the effect on the temperature within the combustion chamber which, in turn, has a beneficial effect on the pressure within the combustion chamber. The graphical representation shown in FIG. 4 illustrates that these benefits can be achieved in an outboard motor engine.

Figure 5:
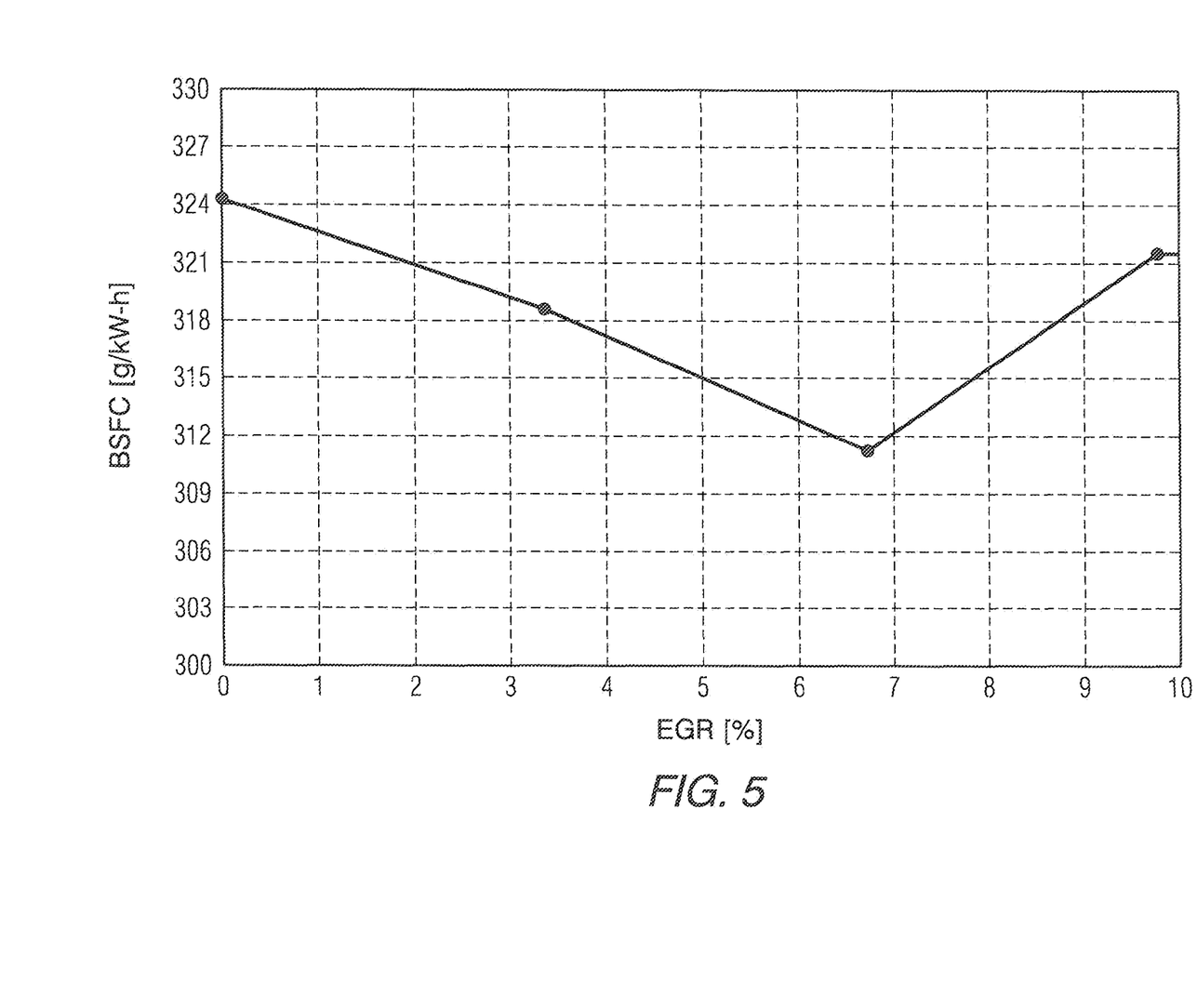
FIG. 5 shows the beneficial effects of EGR on fuel consumption of an outboard motor engine.

FIG. 5 is a graphical representation of the effect that exhaust gas recirculation has on the brake specific fuel consumption (BSFC) which is measured in grams per kilowatt-hour. The beneficial effect, as EGR is increased from 0% to slightly less than 7%, can clearly be seen in FIG. 5.

With continued reference to FIGS. 1-5, several embodiments of the present invention have been described and illustrated. Certain characteristics are common to all of these embodiments. Other characteristics, such as the location of the heat exchanger within the structure of the cylinder head of the engine 12 or outside of the structure of the engine, are distinguishing characteristics between alternative embodiments of the present invention. With particular reference to FIGS. 1 and 2, it can be seen that an outboard motor made in accordance with certain embodiments of the present invention comprises an engine 12 having a plurality of cylinders 70, an exhaust conduit 76 connected in fluid communication with a plurality of cylinders, an air intake conduit 74 connected in fluid communication with a plurality of cylinders 70, a recirculation conduit 94 connected in fluid communication between the exhaust conduit 76 and the air intake conduit 74 and configured to direct a flow of exhaust gas E to the air intake conduit 74, a pump 30 configured to draw water from a body of water in which the outboard motor is operating, and a heat exchanger 40 configured to direct the flow of exhaust gas E in thermal communication with the water drawn by the pump 30 from the body of water in which the outboard motor is operating, wherein the heat exchanger 40 is disposed outside the structure of the engine. The heat exchanger can be a relatively conventional heat exchanger as illustrated in FIG. 1 or the overall structure of the cavity 20 within the driveshaft housing 18. The heat exchanger 40 can comprise a tubular structure, as shown in FIG. 1, and the pump 30 can be connected in fluid communication with the heat exchanger 40 and configured to induce the water to flow through the tubular structure. Alternatively, the heat exchanger which is disposed outside the structure of the engine 12 can be provided by a driveshaft housing 18 having a cavity 20 formed within its structure. The exhaust conduit, which can be the exhaust manifold or the exhaust pipe 46, is connected in fluid communication with the cavity 20 to direct the exhaust gas E from the plurality of cylinders 70 into the cavity 20. A water port 56 can be configured to direct a flow of water in thermal communication with the exhaust gas E. The recirculation conduit 48 can be disposed in fluid communication between the cavity 20 and the air intake conduit 74.

With continued reference to FIGS. 1-5, the system can further comprise a valve 50 disposed in fluid communication with the recirculation conduit 48. The valve 50 is configured to selectively inhibit or permit exhaust gas E flow through the recirculation conduit 48. In a preferred embodiment of the present invention, the valve 50 is connected in fluid communication between the exhaust conduit 46 (or the exhaust manifold) and the recirculation conduit 50. The air intake conduit 74 is disposed in fluid communication between an air intake manifold 28 of the engine 12 and one of the plurality of cylinders 70. As described above, the exhaust conduit can be an exhaust manifold of the engine 12. Alternative embodiments of the present invention can comprise a recirculation conduit 94 which is formed as an integral passage within the structure of the engine 12 and connected in fluid communication between the exhaust conduit 76 and the air intake conduit 74. This particular embodiment is illustrated in FIG. 3 and described above. The pump is configured to draw water from a body of water in which the outboard motor is operating. A conduit 90, in this particular embodiment of the present invention shown in FIG. 3, is formed as an integral passage within the structure of the engine 12 and connected in fluid communication with the pump. The conduit 90 is configured to direct a flow of water from the body of water in which the outboard motor is operating, in thermal communication with the recirculation conduit 94. In a preferred embodiment of the present invention, the recirculation conduit 94 is formed as an integral passage within the structure of the cylinder head of the engine 12. Although most embodiments of the present invention are intended for use with engines having a plurality of cylinders, it should be understood that the basic concepts of the present invention are applicable with engines having a single cylinder.

Although the present invention has been described with particular specificity and illustrated to show several embodiments, it should be understood that alternative embodiments are also within its scope.

We claim:

1. An outboard motor, comprising:
   an engine having at least one cylinder;
   an exhaust conduit connected in fluid communication with said at least one cylinder;
   an air intake conduit connected in fluid communication with said at least one cylinder;
   a recirculation conduit connected in fluid communication between said exhaust conduit and said air intake conduit and configured to direct a flow of exhaust gas to said air intake conduit;
   a pump configured to draw water from a body of water in which said outboard motor is operating; and
   a heat exchanger configured to direct said flow of exhaust gas in thermal communication with said water drawn by said pump from said body of water in which said outboard motor is operating, said heat exchanger being disposed outside of the structure of said engine.

2. The outboard motor of claim 1, further comprising:
   a drive shaft housing having a cavity formed within its structure, said exhaust conduit being connected in fluid communication with said cavity to direct said exhaust gas from said at least one cylinder into said cavity; and
   a water port configured to direct a flow of water in thermal communication with said exhaust gas, said recirculation conduit being disposed in fluid communication between said cavity and said air intake conduit.

3. The outboard motor of claim 1, wherein:
   said air intake conduit is disposed in fluid communication between an air intake manifold of said engine and one of said plurality of cylinders.

4. The outboard motor of claim 1, wherein:
   said exhaust conduit is an exhaust manifold of said engine.

5. The outboard motor of claim 1, wherein:
   said heat exchanger comprises a tubular structure.

6. The outboard motor of claim 5, wherein:
   said pump is connected in fluid communication with said heat exchanger and configured to induce said water to flow through said tubular structure.

7. The outboard motor of claim 1, further comprising:
   a valve disposed in fluid communication with said recirculation conduit, said valve being configured to selectively inhibit or permit exhaust gas flow through said recirculation conduit.

8. The outboard motor of claim 7, wherein:
   said valve is connected in fluid communication between said exhaust conduit and said recirculation conduit.

9. An outboard motor, comprising:
   an engine having a plurality of cylinders;
   an exhaust conduit connected in fluid communication with said plurality of cylinders, said exhaust conduit comprising an exhaust manifold of said engine;
   an air intake conduit connected in fluid communication with said plurality of cylinders;
   a recirculation conduit connected in fluid communication between said exhaust conduit and said air intake conduit and configured to direct a flow of exhaust gas to said air intake conduit;
   a pump configured to draw water from a body of water in which said outboard motor is operating;
   a heat exchanger configured to direct said flow of exhaust gas in thermal communication with said water drawn by said pump from said body of water in which said outboard motor is operating, said heat exchanger being disposed outside of the structure of said engine; and
   a valve disposed in fluid communication with said recirculation conduit, said valve being configured to selectively inhibit or permit exhaust gas flow through said recirculation conduit, said valve being connected in fluid communication between said exhaust conduit and said recirculation conduit.

10. The outboard motor of claim 9, further comprising:
    a drive shaft housing having a cavity formed within its structure, said exhaust conduit being connected in fluid communication with said cavity to direct said exhaust gas from said plurality of cylinders into said cavity; and
    a water port configured to direct a flow of water in thermal communication with said exhaust gas, said recirculation conduit being disposed in fluid communication between said cavity and said air intake conduit.

11. The outboard motor of claim 9, wherein:
    said air intake conduit is disposed in fluid communication between an air intake manifold of said engine and one of said plurality of cylinders.

12. The outboard motor of claim 9, wherein:
    said heat exchanger comprises a tubular structure.

13. The outboard motor of claim 12, wherein:
    said pump is connected in fluid communication with said heat exchanger and configured to induce said water to flow through said tubular structure.

14. An outboard motor, comprising:
    an engine having a plurality of cylinders;
    an exhaust conduit connected in fluid communication with said plurality of cylinders, said exhaust conduit comprising an exhaust manifold of said engine;
    an air intake conduit connected in fluid communication with said plurality of cylinders, said air intake conduit being disposed in fluid communication between an air intake manifold of said engine and one of said plurality of cylinders;
    a recirculation conduit connected in fluid communication between said exhaust conduit and said air intake conduit and configured to direct a flow of exhaust gas to said air intake conduit;
    a pump configured to draw water from a body of water in which said outboard motor is operating;
    a heat exchanger configured to direct said flow of exhaust gas in thermal communication with said water drawn by said pump from said body of water in which said outboard motor is operating, said heat exchanger being disposed outside of the structure of said engine;
    a valve disposed in fluid communication with said recirculation conduit, said valve being configured to selectively inhibit or permit exhaust gas flow through said recirculation conduit, said valve being connected in fluid communication between said exhaust conduit and said recirculation conduit; and
    a drive shaft housing having a cavity formed within its structure, said exhaust conduit being connected in fluid communication with said cavity to direct said exhaust gas from said plurality of cylinders into said cavity.

15. The outboard motor of claim 14, further comprising:
a water port configured to direct a flow of water in thermal communication with said exhaust gas, said recirculation conduit being disposed in fluid communication between said cavity and said air intake conduit.

16. The outboard motor of claim 14, wherein:
said heat exchanger comprises a tubular structure.

17. The outboard motor of claim 16, wherein:
said pump is connected in fluid communication with said heat exchanger and configured to induce said water to flow through said tubular structure.

* * * * *